US012805432B1

(12) United States Patent
Li et al.

(10) Patent No.: US 12,805,432 B1
(45) Date of Patent: Nov. 24, 2026

(54) FLOATING DEVICE FOR CUTTER HEAD, AND MOWING ROBOT

(71) Applicant: Shenzhen GOKO Innovation Technology Co., Ltd., Shenzhen (CN)

(72) Inventors: Pengjian Li, Shenzhen (CN); Haifeng Zhang, Shenzhen (CN); Chengtong He, Shenzhen (CN); Huayang Xu, Shenzhen (CN)

(73) Assignee: Shenzhen GOKO Innovation Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/573,268

(22) Filed: Mar. 20, 2026

(30) Foreign Application Priority Data

Oct. 31, 2025 (CN) ........................ 202511583877.2

(51) Int. Cl.
*A01D 34/74* (2006.01)
*A01D 75/18* (2006.01)

(52) U.S. Cl.
CPC ........... *A01D 34/74* (2013.01); *A01D 75/185* (2013.01)

(58) Field of Classification Search
CPC ...... A01D 34/74; A01D 34/54; A01D 41/145; A01B 63/30
See application file for complete search history.

(56) References Cited

U.S. PATENT DOCUMENTS 1,973,993 A * 9/1934 Pearson ................. A01D 34/07 56/15.2
4,551,967 A * 11/1985 Murcko ................. A01D 43/16 56/13.7
5,092,111 A * 3/1992 Gleeson ............... A01D 34/661 D15/16
2003/0110920 A1* 6/2003 Ito .......................... G10D 3/153 84/298
2018/0184591 A1* 7/2018 Song ...................... A01D 34/58
2020/0128730 A1* 4/2020 Nakano ................ A01D 34/736

FOREIGN PATENT DOCUMENTS

CN 2060618 U * 8/1990

* cited by examiner

*Primary Examiner* — Cathleen R Hutchins
(74) *Attorney, Agent, or Firm* — Westbridge IP LLC

(57) ABSTRACT

A floating device for a cutter head is applied to a mowing robot and includes a swing rod, a cutter head assembly, and a lifting assembly. The swing rod is mounted at the mowing robot and capable of swinging relative to the mowing robot. The cutter head assembly is rotatably connected to the swing rod. The lifting assembly includes a driving member and a lifting rope. The driving member is mounted at the mowing robot and drivingly connected to the lifting rope, and the lifting rope is connected to the cutter head assembly for driving the cutter head assembly to swing with the swing rod.

17 Claims, 8 Drawing Sheets

A

B

FLOATING DEVICE FOR CUTTER HEAD, AND MOWING ROBOT

CROSS-REFERENCE TO RELATED APPLICATIONS

This application claims priority to Chinese Patent Application No. 202511583877.2, filed on Oct. 31, 2025, the entire contents of which are incorporated herein by reference.

TECHNICAL FIELD

The present application relates to the technical field of mowing components, and in particular to a floating device for a cutter head, and a mowing robot.

BACKGROUND

Existing mowing robots are generally equipped with a floating device for cutter head, so that the cutter head assembly can float up and down with the terrain and maintain a constant height from the ground. In the related art, floating devices for cutter heads commonly employ structures such as guide columns or sleeves to adjust the vertical position of the cutter head assembly along a vertical direction. However, when the mowing robot encounters foreign objects such as rocks, tree roots, or steps during traveling, the cutter head assembly is prone to mechanical jamming due to excessive instantaneous impact force, and even causes damage to transmission components or stall of the cutter head assembly in severe cases, thereby affecting the continuity of mowing operation and the reliability of the equipment.

SUMMARY

The main purpose of the present application is to provide a floating device for a cutter head, and a mowing robot, aiming to reduce the risk of jamming of the cutter head assembly.

In order to achieve the above purpose, the present application provides a floating device for a cutter head, which is applied to a mowing robot, and the floating device for the cutter head includes: a swing rod, a cutter head assembly and a lifting assembly; the swing rod is mounted at the mowing robot and capable of swinging relative to the mowing robot; the cutter head assembly is rotatably connected to the swing rod; and the lifting assembly includes a driving member and a lifting rope, the driving member is mounted at the mowing robot and drivingly connected to the lifting rope, and the lifting rope is connected to the cutter head assembly for driving the cutter head assembly to swing with the swing rod.

In an embodiment, the cutter head assembly includes a cutter head body and a cutter head frame, the cutter head body is mounted at the cutter head frame, and the lifting rope is connected to the cutter head frame.

In an embodiment, the cutter head assembly includes two cutter head bodies, the lifting assembly is located between the two cutter head bodies, and the lifting rope is connected to the cutter head frame between the two cutter head bodies.

In an embodiment, the cutter head frame is provided with a clamping hole, a limiting groove is provided at a lower side of the cutter head frame, the clamping hole penetrates through a bottom of the limiting groove, a limiting ball is provided at an end of the lifting rope, the lifting rope passes through the clamping hole, and the limiting ball is mounted in the limiting groove.

In an embodiment, the floating device for the cutter head includes: a mounting base, the mounting base is mounted at the mowing robot, one end of the swing rod is rotatably connected to the mounting base, and another end of the swing rod is rotatably connected to a side of the cutter head assembly distant from the mounting base.

In an embodiment, a movable groove is provided at a side of the mounting base facing the cutter head assembly, an end of the swing rod is rotatably connected to the movable groove, an upper limiting portion is provided at an upper side of an opening of the movable groove, the upper limiting portion is capable of abutting against an upper side of the swing rod in a limiting manner, a lower limiting portion is provided at the end of the swing rod, and the lower limiting portion is capable of abutting against a bottom wall of the movable groove in a limiting manner.

In an embodiment, the lifting rope is connected to a side of the cutter head assembly distant from the mounting base.

In an embodiment, the lifting assembly further includes a retractable wheel and at least one transmission wheel; one end of the lifting rope is connected to the retractable wheel, and the other end of the lifting rope is wound around the transmission wheel and connected to the cutter head assembly; and the retractable wheel is provided close to the mounting base, and the transmission wheel is provided close to the side of the cutter head assembly distant from the mounting base.

In an embodiment, a rotation axis of the retractable wheel extends in a vertical direction, the rotation axis of the transmission wheel extends in a horizontal direction, and a tangent edge of the retractable wheel is flush with an upper tangent edge of the transmission wheel.

In an embodiment, the retractable wheel includes an upper wheel housing and a lower wheel housing, the upper wheel housing and the lower wheel housing enclose to form a winding annular groove, a fixing column is further provided between the upper wheel housing and the lower wheel housing, an end of the lifting rope is sleeved on the fixing column, and the lifting rope is wound around the winding annular groove.

In an embodiment, the floating device for the cutter head further includes two swing rods, the two swing rods are distributed in the vertical direction, and tension springs are connected to opposite sides of the two swing rods.

In an embodiment, the swing rod includes two support arms and a connecting rod connecting middle portions of the two support arms, and the cutter head assembly is located between the two support arms and rotatably connected to ends of the two support arms.

The present application further provides a mowing robot, including: a chassis; and the floating device for the cutter head as described above, the chassis is recessed from bottom to top with a relief groove, and the floating device for the cutter head is mounted at the chassis and movably provided in the relief groove.

In an embodiment, an upper side of the chassis is recessed with a mounting groove, the lifting rope is located between a bottom wall of the relief groove and the cutter head assembly, the driving member is mounted in the mounting groove, and an output shaft of the driving member passes through the relief groove and is drivingly connected to the lifting rope.

In an embodiment, an opening of the mounting groove is further sealingly provided with a cover body.

According to the technical solution of the present application, the swing rod is swingably mounted at the chassis of the mowing robot, so that the swing rod can swing up and down in a vertical plane. The cutter head assembly is mounted at the lower end of the swing rod through a rotating connection structure, so that the cutter head assembly can float up and down as a whole under the drive of the swing rod while maintaining its own rotating mowing function. The lifting assembly includes a driving member mounted at the chassis and a lifting rope connected to an output end of the driving member, and the other end of the lifting rope is connected to the cutter head assembly. When the driving member operates, a pulling force is applied to the cutter head assembly or a constraint is released by winding or unwinding the lifting rope, thereby adjusting the height of the cutter head assembly relative to the ground. In this way, during traveling of the mowing robot, if the cutter head assembly encounters a stone, a tree root or other raised foreign objects, the cutter head assembly can swing upward about the swing axis of the swing rod under the guidance of the swing rod, so as to realize a non-rigid lifting action conforming to the contour of the obstacle. Compared with the forced linear movement of the vertical guide rail in the related art, the swinging floating of the present solution reduces the risk of mechanical jamming caused by foreign object impact, improves the adaptive ability of the cutter head to complex terrains, and lowers the risk of jamming of the cutter head assembly. In addition, due to the cooperative action of the swing rod and the lifting rope, the cutter head assembly can be stably reset under gravity or reverse control of the driving member after passing over an obstacle, thereby ensuring the consistency of mowing height and continuity of operation.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

The achievement of the objectives, functional features, and advantages of the present application will be further explained with reference to the embodiments and accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

It should be noted that if there are directional indications, such as up, down, left, right, front, back, etc., involved in the embodiments of the present application, the directional indications are only used to explain a certain posture as shown in the accompanying drawings. If the specific posture changes, the directional indication also changes accordingly.

In addition, if there are descriptions related to "first", "second", etc. in the embodiments of the present application, the descriptions of "first", "second", etc. are only for the purpose of description, and should not be construed as indicating or implying relative importance or implicitly indicating the number of technical features indicated. Thus, a feature delimited with "first", "second" may expressly or implicitly include at least one of these features. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of the present application.

The present application provides a floating device for a cutter head.

Figure 1:
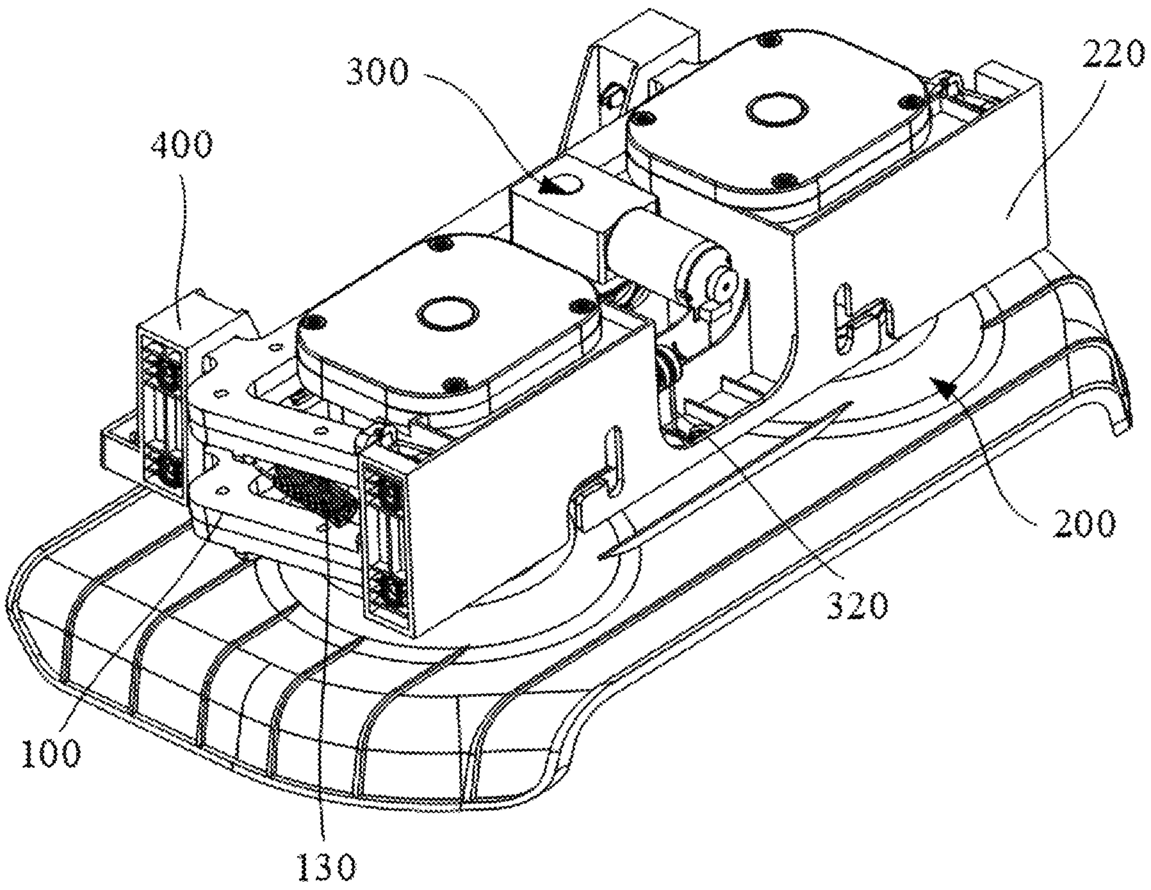
FIG. 1 is a schematic structural view of a floating device for a cutter head according to an embodiment of the present application in a retracted state.
Figure 2:
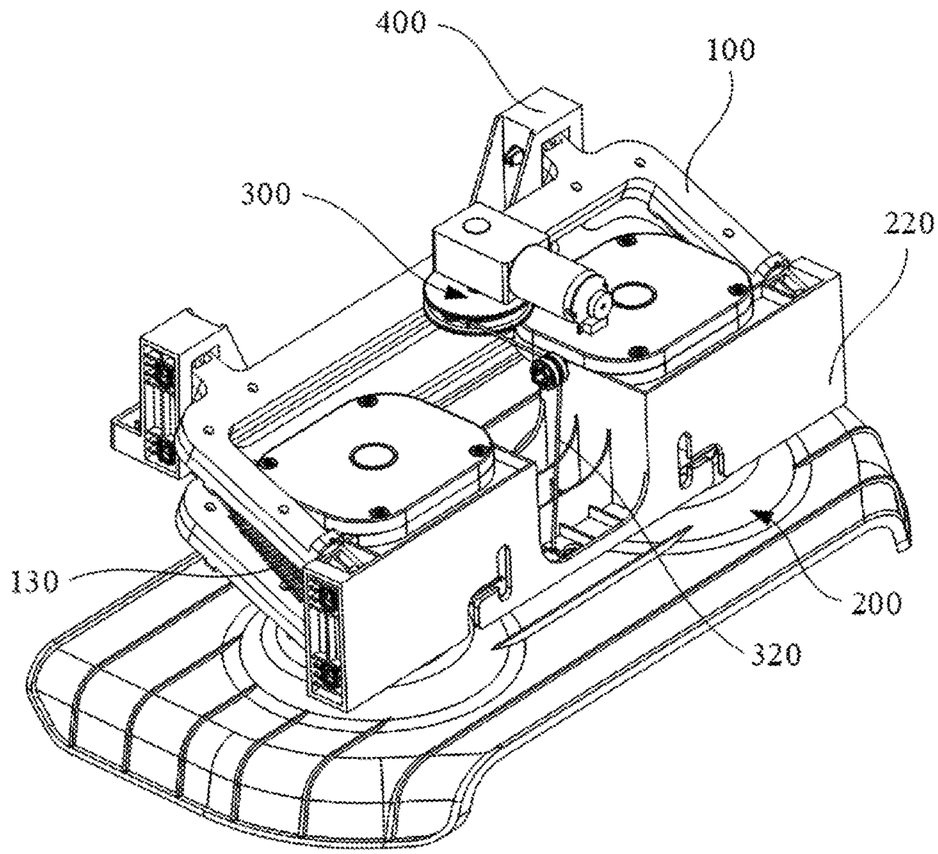
FIG. 2 is a schematic structural view of the floating device for the cutter head according to an embodiment of the present application in a lowered state.
Figure 7:
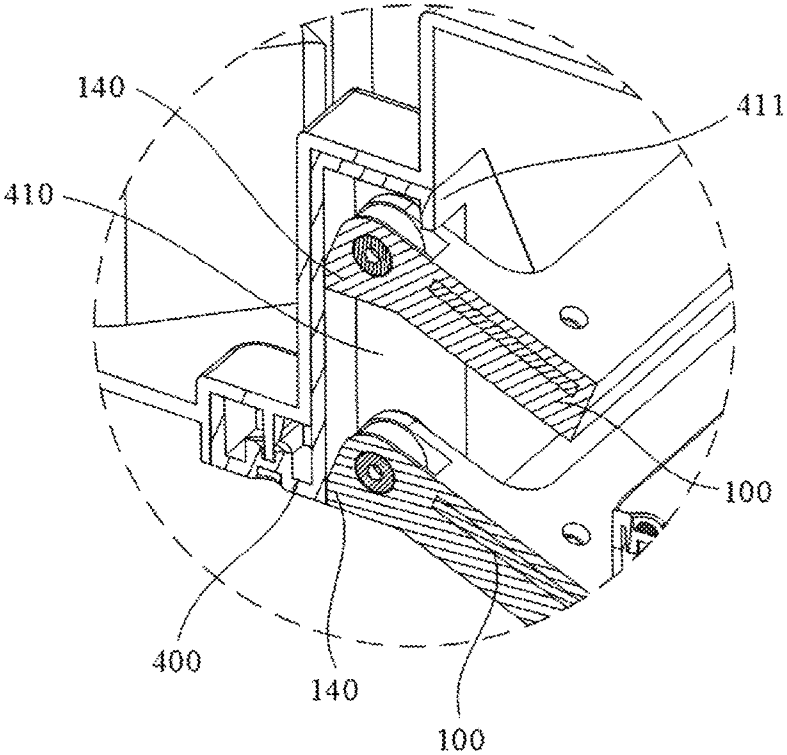
FIG. 7 is a partial enlarged view of point B in FIG. 6.

Referring to FIGS. 1, 2, and 7, in an embodiment of the present application, the floating device for the cutter head is applied to a mowing robot, and the floating device for the cutter head includes: a swing rod 100, a cutter head assembly 200, and a lifting assembly 300.

The swing rod 100 is mounted at the mowing robot and capable of swinging relative to the mowing robot.

The cutter head assembly 200 is rotatably connected to the swing rod 100.

The lifting assembly 300 includes a driving member 310 and a lifting rope 320. The driving member 310 is mounted at the mowing robot and drivingly connected to the lifting rope 320, and the lifting rope 320 is connected to the cutter head assembly 200 for driving the cutter head assembly 200 to swing with the swing rod 100.

According to the technical solution of the present application, the swing rod 100 is swingably mounted at the chassis 500 of the mowing robot, so that the swing rod 100 can swing up and down in a vertical plane. The cutter head assembly 200 is mounted at the lower end of the swing rod 100 through a rotational connection structure, so that the cutter head assembly 200 can float up and down as a whole under the drive of the swing rod 100 while maintaining its own rotating mowing function. The lifting assembly 300 includes a driving member 310 mounted at the chassis 500 and a lifting rope 320 connected to an output end of the driving member 310, and the other end of the lifting rope 320 is connected to the cutter head assembly 200. When the driving member 310 operates, a pulling force is applied to the cutter head assembly 200 or a constraint is released by winding and unwinding the lifting rope 320, thereby adjusting the height of the cutter head assembly 200 relative to the ground. In this way, during traveling of the mowing robot, if the cutter head assembly 200 encounters a stone, a tree root or other raised foreign objects, the cutter head assembly 200 can swing upward about the swing axis of the swing rod 100 under the guidance of the swing rod 100, so as to realize a non-rigid lifting action conforming to the contour of the obstacle. Compared with the forced linear movement of vertical guide rails in the related art, the swinging floating of the present solution reduces the risk of mechanical jamming caused by foreign object impact, improves the adaptive ability of the cutter head to complex terrains, and lowers the risk of jamming of the cutter head assembly 200. In addition, due to the cooperative effect of the swing rod 100 and the lifting rope 320, the cutter head assembly 200 can be stably reset under gravity or reverse control of the driving member 310 after passing over an obstacle, thereby ensuring the consistency of mowing height and the continuity of operation.

It should be noted that the lifting rope 320 is configured as a steel wire rope, high-strength fiber rope, or flexible cable, etc. Under the driving action of the driving member 310, the lifting rope 320 maintains pulling force and can be wound into other components of the lifting assembly 300 when the driving member 310 outputs, to ensure the cleanliness of the lifting rope 320 during use. At the same time, the lifting rope 320 is connected to a portion of the cutter head assembly 200 that is not provided with blades, such as the cutter head frame 220, which can not only pull the cutter head assembly 200 for lifting and lowering, but also reduce interference with the mowing operation of the cutter head assembly 200. Correspondingly, the swing rod 100 is also rotatably connected to the cutter head frame 220. In addition, the cutter head assembly 200 is provided with a driving mechanism for driving a cutter body provided with blades to rotate, so that the cutter head frame 220, the cutter head, and the driving mechanism swing synchronously with the swing rod 100 to achieve lifting and lowering. The mowing robot is provided with a chassis 500, and the cutter head assembly 200 and the swing rod 100 are provided at a lower position of the chassis 500. An end portion where the swing rod 100 is rotatably connected to the chassis 500 rotates in a horizontal direction, and its rotation axis is consistent with a left-right distribution direction of the chassis 500, so that the swing rod 100 swings in a front-rear direction of the mowing robot. Correspondingly, when the cutter head assembly 200 moves from bottom to top, it has a swinging tendency from front to rear; when moving from top to bottom, it has a swinging tendency from rear to front. Thus, after the mowing robot encounters an obstacle at the bottom in the forward direction, the cutter head can swing upward adaptively, so as to achieve flexible floating and avoid jamming. The directions such as up, down, left, right, front and rear referred to in the present solution are defined with reference to the state of the mowing robot during normal operation, and will not be repeated in the following description.

Figure 3:
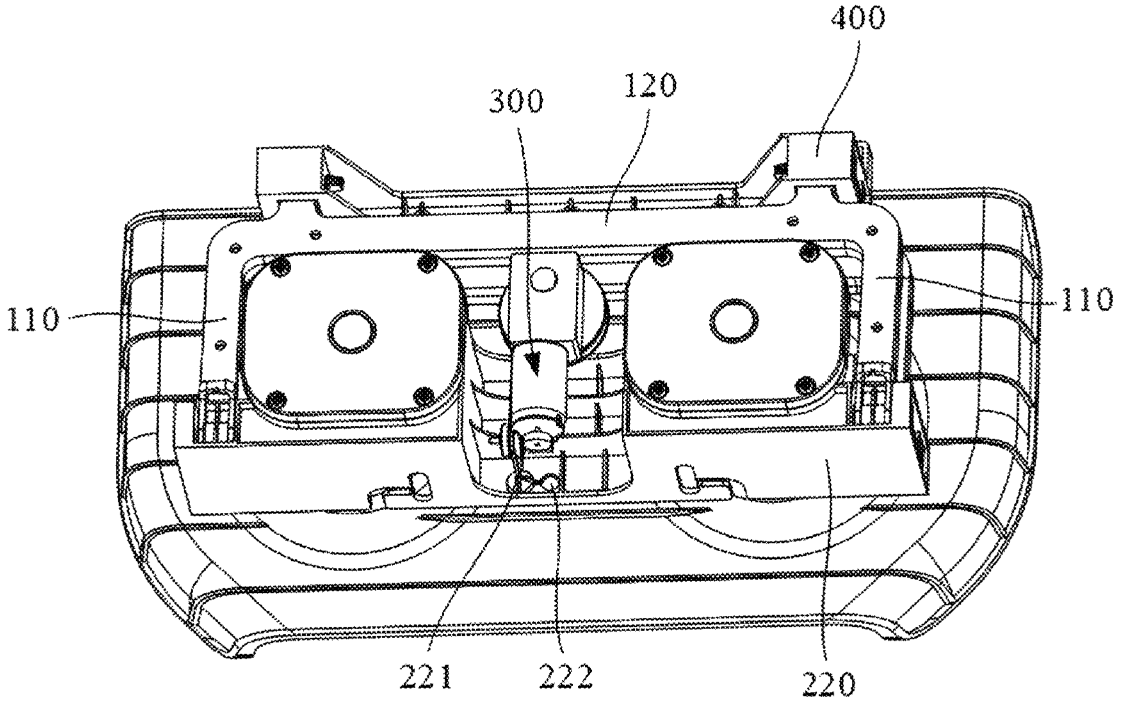
FIG. 3 is a schematic structural view of the floating device for the cutter head in FIG. 1 from another perspective.

In an embodiment, referring to FIGS. 1 to 3, the cutter head assembly 200 includes a cutter head body 210 and a cutter head frame 220. The cutter head body 210 is mounted at the cutter head frame 220, and the lifting rope 320 is connected to the cutter head frame 220. The cutter head frame 220 includes a mounting structure and a cover plate. The cover plate is connected to the lower side of the mounting structure. The cutter head body 210 includes a cutter head with blades and a rotation driving mechanism. The rotation driving mechanism is mounted at the mounting structure of the cutter head frame 220 and is drivingly connected to the cutter head. The cutter head is exposed below the cover plate. The rotation driving mechanism of the cutter head body 210 is fixedly mounted at the mounting structure of the cutter head frame 220 by bolts, clips, or bearings. The cover plate is configured to protect the cutter head. In this way, the pulling force or release action applied by the lifting rope 320 can be transmitted to the entire cutter head assembly 200 through the cutter head frame 220, thereby precisely adjusting the floating height of the cutter head assembly 200 under the control of the driving member 310. In addition, when the cutter head assembly 200 encounters foreign objects during traveling, the cutter head frame 220, as an intermediate structure for force distribution and connection, effectively disperses the impact load. The lifting rope 320 can also promptly act on the cutter head frame 220, reducing interference with the grass cutting operation of the cutter head body 210. The swing rod 100 is rotatably connected to the cutter head frame 220 and rotatably connected to the mounting structure for mounting the rotation driving mechanism of the cutter head body 210. The connection position of the lifting rope 320 to the cutter head frame 220 is selected based on the installation location and number of cutter head bodies 210, so as to ensure that the lifting rope 320 drives the cutter head assembly 200 to swing up and down stably. In other embodiments, the lifting rope 320 can also be connected to the rotation driving mechanism that drives the cutter head to rotate in the cutter head assembly 200.

In this embodiment, referring to FIGS. 1 to 3, the cutter head assembly 200 includes two cutter head bodies 210, the lifting assembly 300 is located between the two cutter head bodies 210, and the lifting rope 320 is connected to the cutter head frame 220 between the two cutter head bodies 210. It can be understood that the two cutter head bodies 210 arranged side by side are jointly mounted at the same cutter head frame 220, so as to realize cooperative mowing by the dual cutter heads and improve the working efficiency and coverage uniformity. The lifting assembly 300 is located in the area between the two cutter head bodies 210. After being led out from the driving member 310, the lifting rope 320 is connected to the middle portion or a position close to the center of gravity of the cutter head frame 220 in the space between the two cutter head bodies 210. In this way, the structural space of the cutter head assembly 200 is utilized, interference between the lifting rope 320 and the cutter head body 210 is avoided, and the vertical space occupied by the lifting assembly 300 and the cutter head assembly 200 is further reduced. At the same time, the application point of the traction force exerted by the lifting rope 320 is located close to the center of the cutter head assembly 200, so that when the height is adjusted by the driving member 310, the load can be uniformly transmitted and the eccentric moment is reduced, thereby ensuring that the lifting rope 320 can smoothly adjust the height position of the cutter head assembly 200. Correspondingly, the cutter head frame 220 is provided with two mounting structures for mounting two cutter head bodies 210, and a connecting bridge is provided between the two mounting structures. The connecting bridge is opposite to the cover plate at intervals, and the lifting rope 320 is connected to the connecting bridge. In addition, in this embodiment, the swing rod 100 is connected to the mounting structures of the cutter head frame 220 at opposite sides of the two cutter head bodies 210. The connection point between the lifting rope 320 and the cutter head frame 220 is located at the center of the cutter head assembly 200, i.e., at the central position between the left and right sides, such that the swing rod 100 pulls the cutter head assembly 200 to swing at the left and right sides, and the lifting rope 320 drives the cutter head assembly 200 to swing at the central position in the left-right direction, thereby guaranteeing the stability in controlling the lifting and lowering of the cutter head assembly 200. In other embodiments, the cutter head assembly 200 may also be provided with only one cutter head body 210, and the lifting rope 320 is connected to the cutter head frame 220 at a position close to the center of gravity of the cutter head assembly 200.

Figure 9:
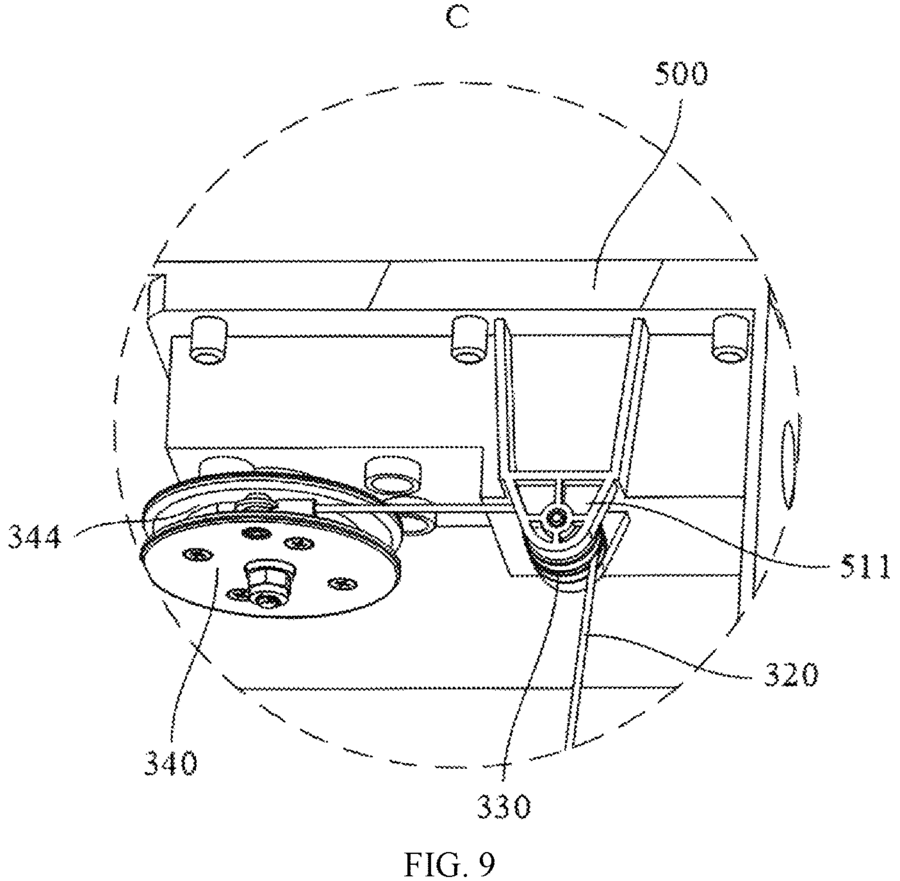
FIG. 9 is a partial enlarged view of point C in FIG. 8.
Figure 10:
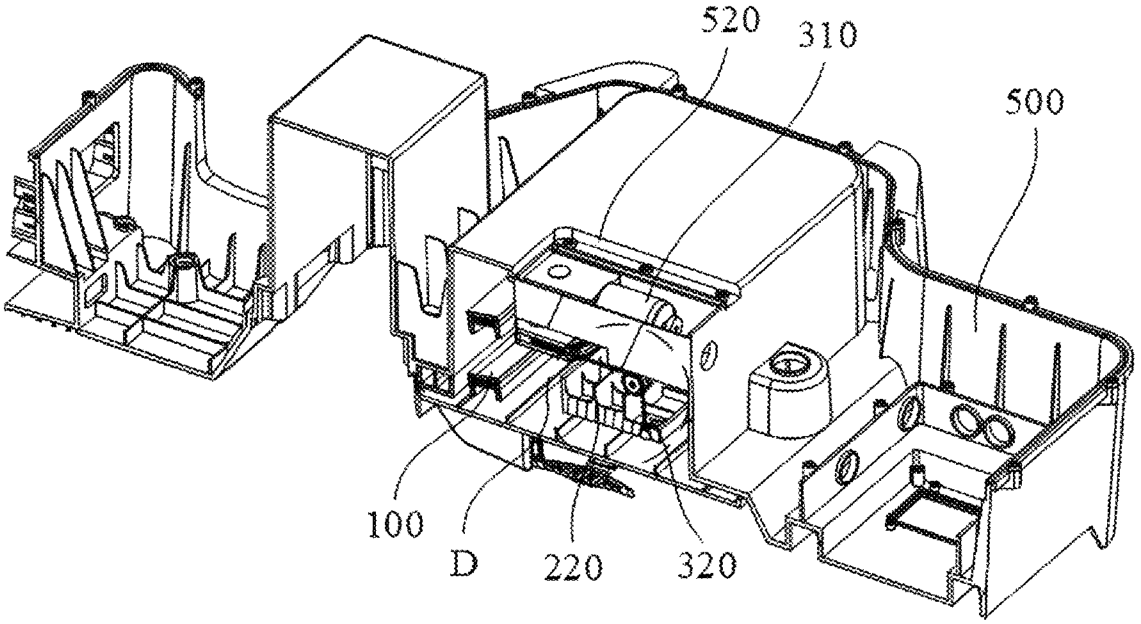
FIG. 10 is a cross-sectional view of the floating device for the cutter head in cooperation with the chassis in FIG. 1 from another perspective.

In an embodiment, referring to FIGS. 9 and 10, the cutter head frame 220 is provided with a clamping hole 221, and a limiting groove 223 is provided at the lower side of the cutter head frame 220. The clamping hole 221 penetrates through the bottom of the limiting groove 223. A limiting ball 321 is provided at the end of the lifting rope 320. The lifting rope 320 passes through the clamping hole 221. The limiting ball 321 is mounted in the limiting groove 223. It can be understood that the clamping hole 221 is provided at the connecting bridge. During assembly, the lifting rope 320 passes through the clamping hole 221 from top to bottom, so that the limiting ball 321 is embedded and limited in the limiting groove 223. The cooperation between the limiting ball 321 and the limiting groove 223 effectively prevents the lifting rope 320 from disengaging from the cutter head frame 220 under tension or vibration conditions. At the same time, the clamping hole 221 guides and constrains the lifting rope 320, ensuring that the traction force is stably transmitted along a predetermined direction. In addition, the groove wall of the limiting groove 223 forms dual circumferential and axial limiting for the limiting ball 321. While allowing the lifting rope 320 to swing slightly to adapt to the movement of the swing rod 100, it also prevents the pulling direction of the lifting rope 320 from being changed due to excessive deflection or torsion of the cutter head assembly 200, thereby ensuring the motion stability and response consistency of the cutter head assembly 200 during the process of floating up and down with the swing rod 100. In other embodiments, the end of the lifting rope 320 can also be fixedly connected to the cutter head frame 220.

Figure 11:
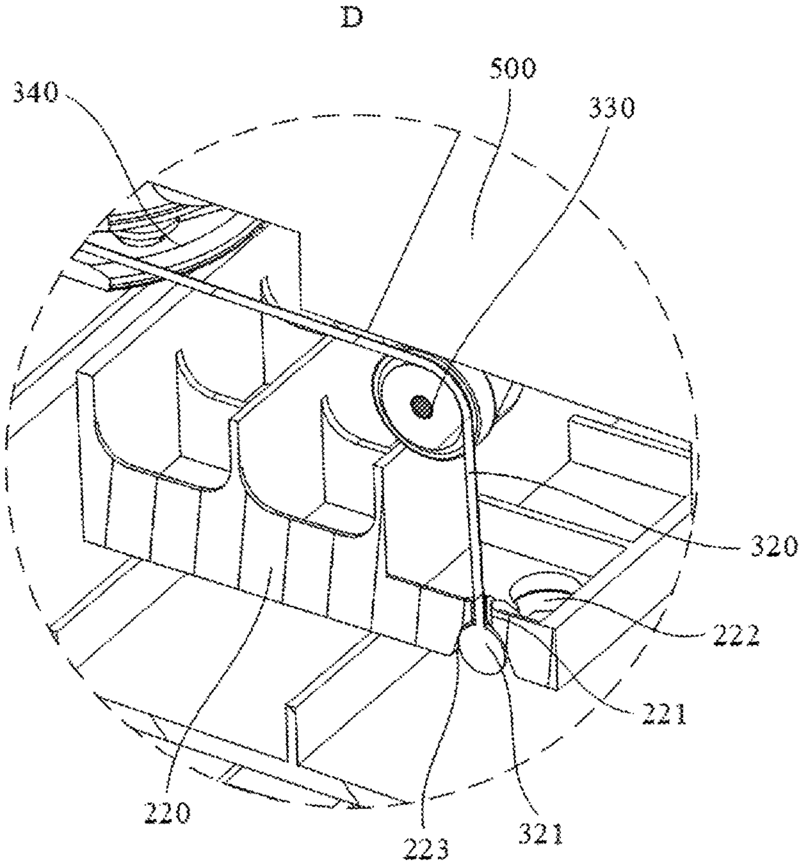
FIG. 11 is a partial enlarged view of point D in FIG. 10.

In this embodiment, referring to FIGS. 10 and 11, the connecting bridge of the cutter head frame 220 is also provided with a snap-in hole 222. The clamping hole 221 penetrates from the bottom of the limiting groove 223 through the opening of the limiting groove 223, and the snap-in hole 222 is in communication with the portion of the clamping hole 221 at the opening of the limiting groove 223. The snap-in hole 222 is flush with the opening of the limiting groove 223. The diameter of the snap-in hole 222 is slightly larger than the diameter of the limiting ball 321, and the hole section where the snap-in hole 222 is in communication with the clamping hole 221 is smaller than the snap-in hole 222. During assembly, the limiting ball 321 is first inserted into the snap-in hole 222, and then the lifting rope 320 is moved to make the lifting rope 320 slide from the snap-in hole 222 into the clamping hole 221. Subsequently, the limiting ball 321 is fittingly mounted in the limiting groove 223, such that the cutter head frame 220 is hoisted through the limiting ball 321 of the lifting rope 320. This not only ensures the stability of the cutter head frame 220 floating driven by the lifting rope 320 but also facilitates the connection between the lifting rope 320 and the cutter head frame 220. In other embodiments, the lifting rope 320 and the limiting ball 321 can be configured as separate components. After the lifting rope 320 is inserted into the clamping hole 221, the limiting ball 321 is connected to the end of the lifting rope 320 by means of clamping, threading, or welding, and is mounted in the limiting groove 223.

Figure 4:
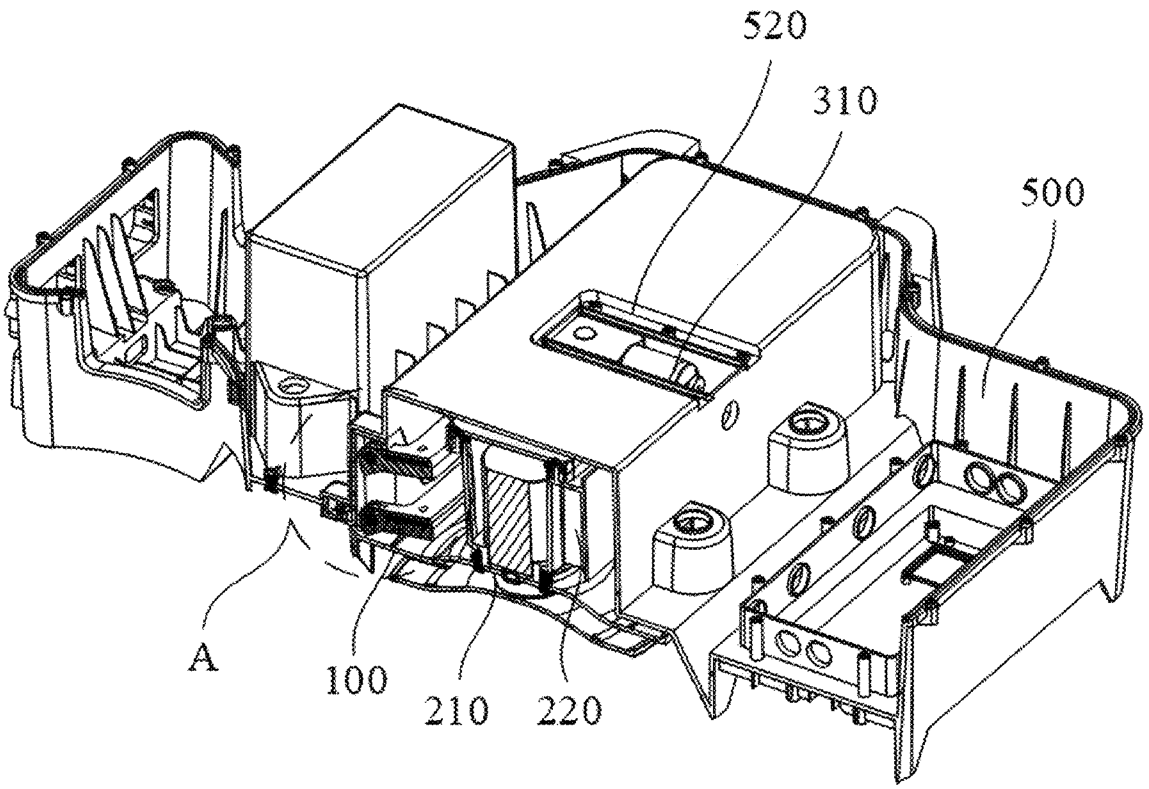
FIG. 4 is a cross-sectional view of the floating device for the cutter head in cooperation with the chassis shown in FIG. 1.
Figure 5:
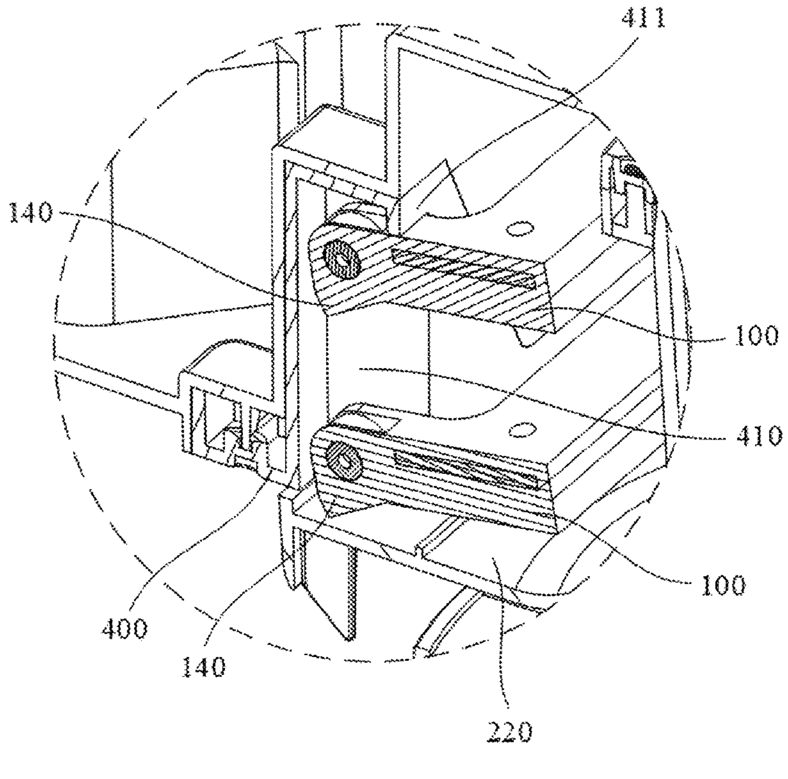
FIG. 5 is a partial enlarged view of point A in FIG. 4.
Figure 6:
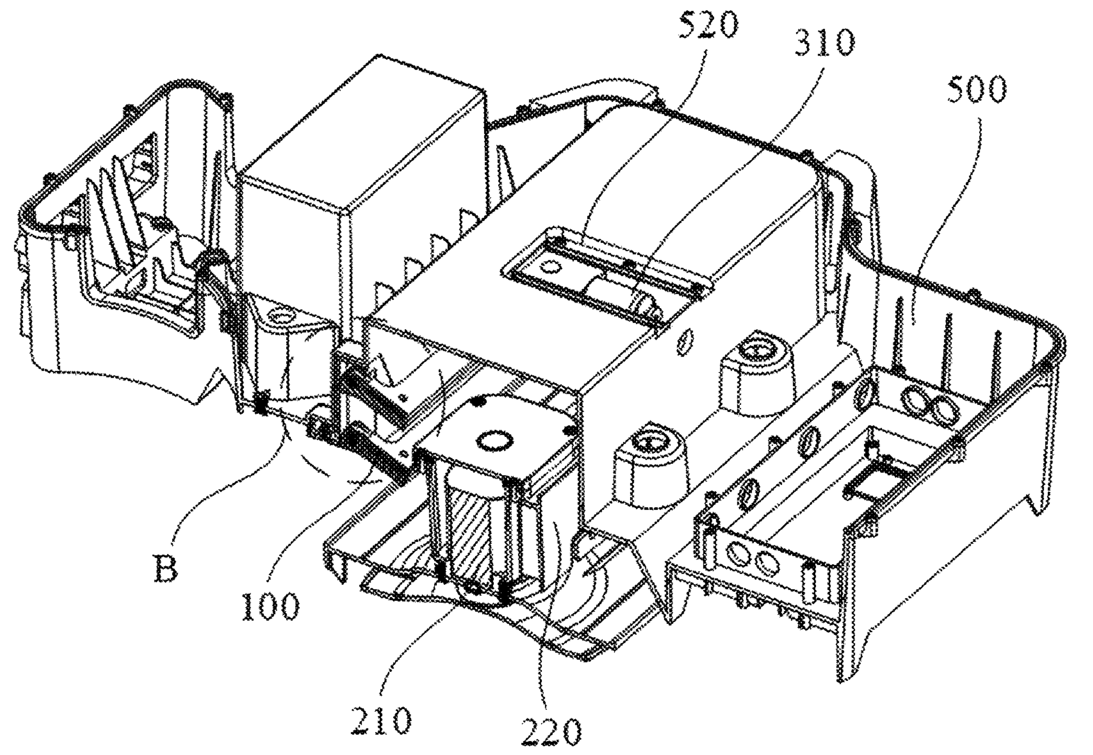
FIG. 6 is a cross-sectional view of the floating device for the cutter head in cooperation with the chassis in FIG. 2.
Figure 8:
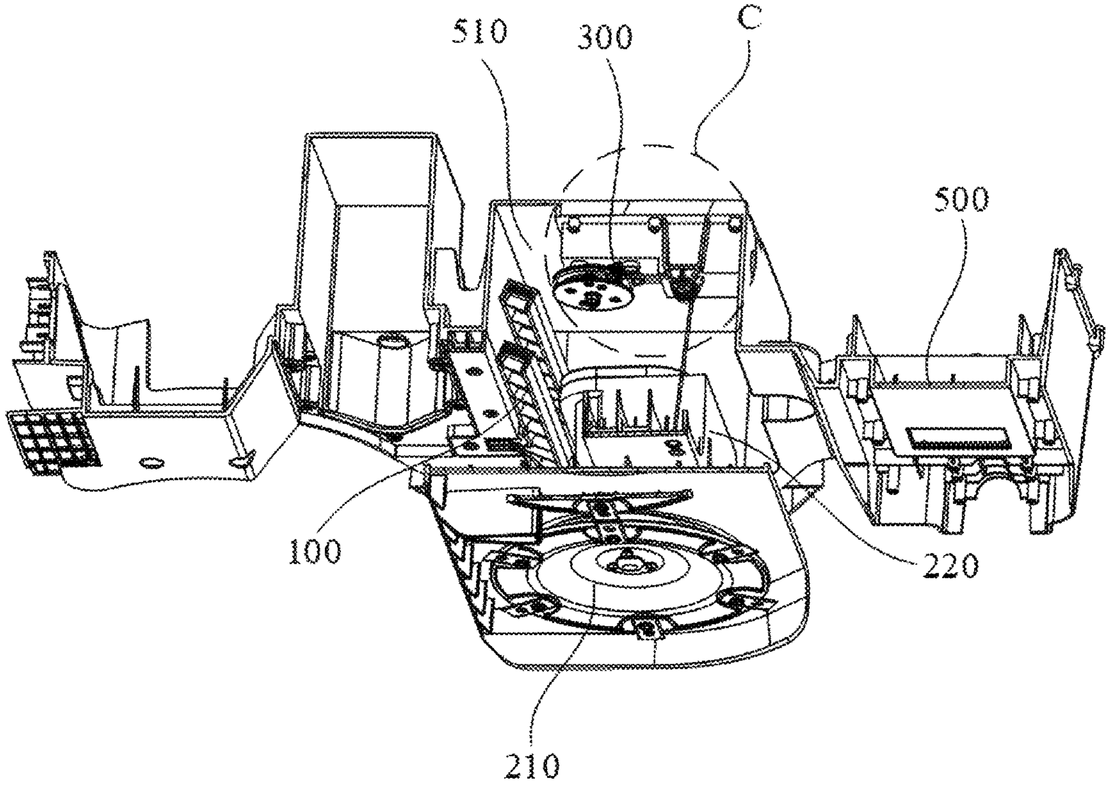
FIG. 8 is a cross-sectional view of the floating device for the cutter head in cooperation with the chassis in FIG. 1 from another perspective.

In an embodiment, referring to FIGS. 4, 6, and 8, the floating device for the cutter head further includes a mounting base 400. The mounting base 400 is mounted at the mowing robot. One end of the swing rod 100 is rotatably connected to the mounting base 400, and the other end of the swing rod 100 is rotatably connected to the side of the cutter head assembly 200 distant from the mounting base 400. It can be understood that the mounting base 400 is fixedly mounted at the chassis 500 of the mowing robot to serve as a mounting structure for the swing rod 100. The mounting base 400 may be provided separately from the chassis 500 and then connected by screw fastening, or the mounting base 400 may be integrally formed with the chassis 500. One end of the swing rod 100 is rotatably connected to the mounting base 400 through a pin, bearing, or hinge structure, while the other end of the swing rod 100 is rotatably connected to the side of the cutter head assembly 200 distant from the mounting base 400, such that the cutter head assembly 200 is positioned between the two ends of the swing rod 100. This arrangement shortens the swing distance of the cutter head assembly 200, thereby reducing the height and length of the mowing robot and ensuring the traveling stability of the mowing robot. In addition, after the mounting base 400, the swing rod 100, and the cutter head assembly 200 are assembled, that is, after the rotatably connected structures on the swing rod 100 are assembled, the floating device for the cutter head is connected to the chassis 500 through the mounting base 400 to complete the assembly. This facilitates the assembly operation of the floating device for the cutter head and improves the assembly convenience for the mowing robot. In other embodiments, the swing rod 100 may be directly rotatably connected to the chassis 500, and the end of the swing rod 100 distant from the chassis 500 is connected to the middle portion of the cutter head frame 220 in the front-rear direction.

In this embodiment, referring to FIGS. 4 to 7, a movable groove 410 is provided at the side of the mounting base 400 facing the cutter head assembly 200. The end of the swing rod 100 is rotatably connected to the movable groove 410. An upper limiting portion 411 is provided at the upper side of the opening of the movable groove 410, and the upper limiting portion 411 is capable of abutting against the upper side of the swing rod 100 in a limiting manner. A lower limiting portion 140 is provided at the end of the swing rod 100, and the lower limiting portion 140 is capable of abutting against the bottom wall of the movable groove 410 in a limiting manner. It can be understood that the swing rod 100 achieves swing control of the upper limit position and the lower limit position through cooperation with the movable groove 410, avoiding interference with the cutter head assembly 200 during mowing operations. The end of the swing rod 100 close to the mounting base 400 is rotatably connected to the movable groove 410 through a pin shaft or bearing, allowing the swing rod 100 to swing about the rotation axis within the groove. When the swing rod 100 swings upward to a predetermined angle as the cutter head assembly 200 is lifted, the upper surface of the swing rod 100 abuts against the upper limiting portion 411 of the movable groove 410, thereby limiting further upward swing of the swing rod 100. When the cutter head assembly 200 is at the lowest working position or swings downward under the action of gravity, the lower limiting portion 140 at the end of the swing rod 100 abuts against the bottom wall of the movable groove 410, preventing the swing rod 100 from moving further downward. In this way, the floating range of the cutter head assembly 200 is effectively limited, the swing stroke of the swing rod 100 is controlled, and excessive lifting or falling is prevented, ensuring that it adaptively responds to terrain changes within a reasonable height range, and avoiding mowing failure due to excessive lifting or damage to the cutter head and ground due to excessive lowering. In other embodiments, a limiting structure can also be provided at the lifting rope 320 to limit the lifting and sliding range of the lifting rope 320, thereby achieving the ultimate limit on lifting or falling of the cutter head assembly 200.

In an embodiment, referring to FIGS. 1, 2 and 10, the lifting rope 320 is connected to the side of the cutter head assembly 200 distant from the mounting base 400. It can be understood that the connection position between the lifting rope 320 and the cutter head assembly 200 forms an effective lever arm between the point of application of the pulling force applied by the lifting rope 320 and the fulcrum of the swing rod 100. Thus, when the driving member 310 retracts or releases the lifting rope 320, the cutter head assembly 200 can be efficiently driven to lift upward or reset downward about the rotation axis of the swing rod 100 by means of the lever principle; when the cutter head encounters an obstacle during the travel of the mowing robot, this connection position helps the cutter head assembly 200 swing upward to avoid the obstacle in a more sensitive and smooth manner, preventing response lag or excessive driving force required due to the traction point being close to the mounting base 400. At the same time, since the lifting rope 320 acts on the side distant from the mounting base 400, the position of its pulling force and the position of the mounting base 400 for connecting the swing rod 100 are respectively located on the rear side and the front side of the center of gravity of the cutter head assembly 200. This makes the center of gravity distribution of the entire floating device for the cutter head more matched, reducing the twisting or swaying of the cutter head assembly 200 during the swinging process, and improving the stability and consistency of the floating action. The lifting rope 320 is connected to the cutter head assembly 200 and is also adjacent to the connection point between the swing rod 100 and the cutter head assembly 200. When the lifting rope 320 lifts and lowers the cutter head assembly 200, the posture stability of the cutter head assembly 200 is ensured. In other embodiments, the lifting rope 320 can also be connected to the middle portion of the cutter head assembly 200 in the front-rear direction.

Figure 12:
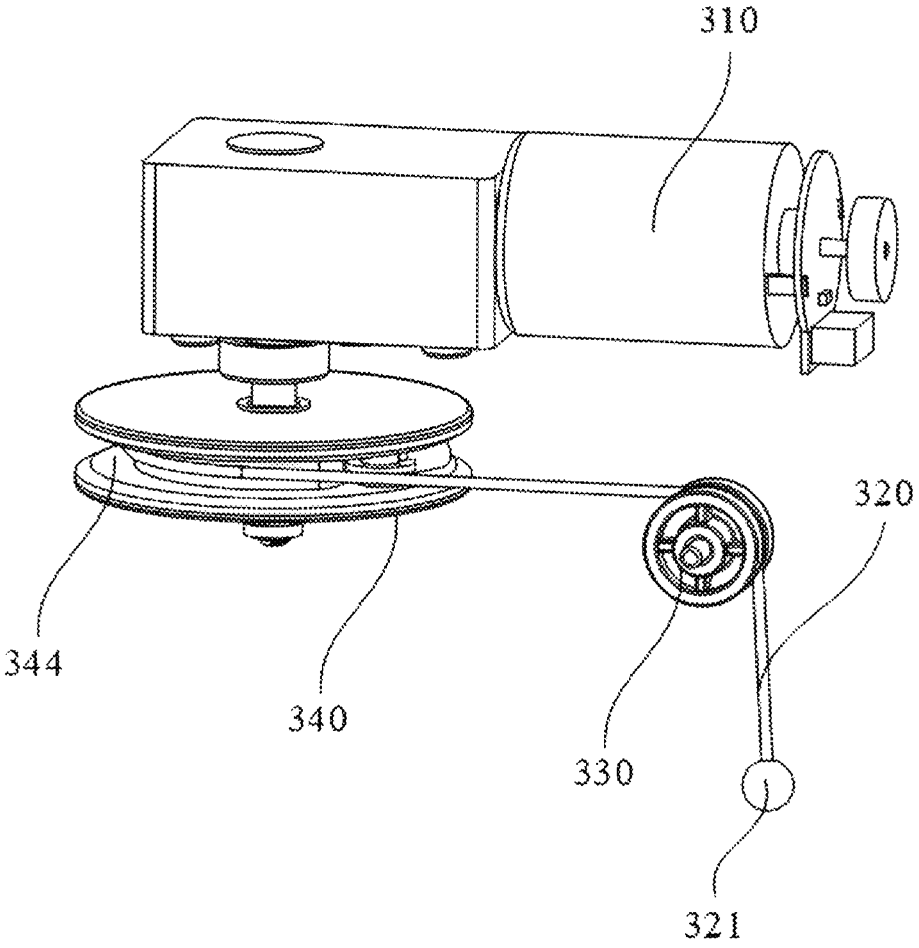
FIG. 12 is a schematic structural view of the lifting assembly in FIG. 1.
Figure 13:
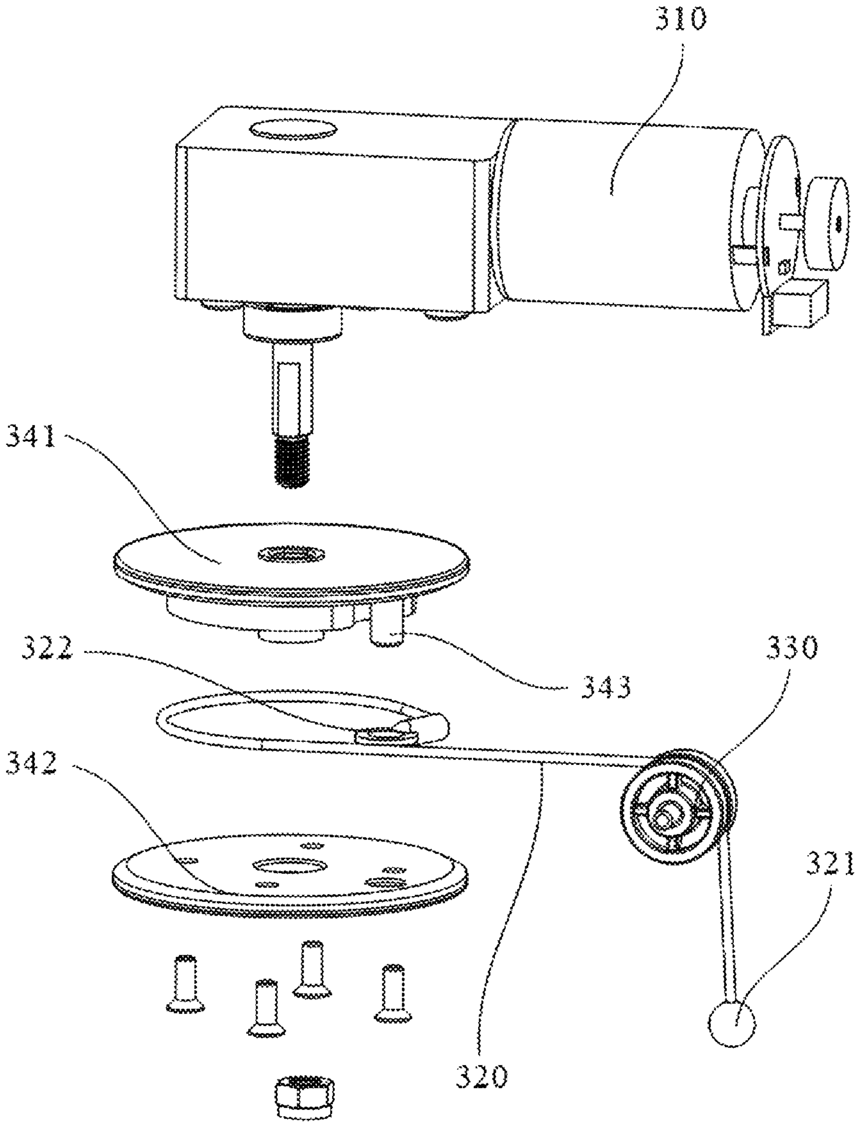
FIG. 13 is an exploded view of the lifting assembly in FIG. 12.

Regarding the structure of the lifting assembly 300, in an embodiment, referring to FIGS. 12 and 13, the lifting assembly 300 further includes a retractable wheel 340 and at least one transmission wheel 330. One end of the lifting rope 320 is connected to the retractable wheel 340, and the other end of the lifting rope 320 is wound around the transmission wheel 330 and connected to the cutter head assembly 200. The retractable wheel 340 is provided close to the mounting base 400, and the transmission wheel 330 is provided close to the side of the cutter head assembly 200 distant from the mounting base 400. It can be understood that the retractable wheel 340 and the transmission wheel 330 are distributed along the front-rear direction, the retractable wheel 340 is located on the front side, and the transmission wheel 330 is located on the rear side. One end of the lifting rope 320 is fixedly connected to the retractable wheel 340, and the other end of the lifting rope 320 is successively wound around the transmission wheel 330 and connected to the side of the cutter head assembly 200 distant from the mounting base 400. The retractable wheel 340 is driven by the driving member 310 and is configured to take up or release the lifting rope 320. The transmission wheel 330 is provided close to the rear side of the cutter head assembly 200 to change the traction direction of the lifting rope 320, so that the lifting rope 320 can act on the connection point of the cutter head assembly 200 in a near-vertical direction. In this way, not only is the limited space inside the mowing robot effectively utilized, but also the direction of the pulling force is made closer to the movement trajectory required for the swing of the cutter head assembly 200 by guiding the direction of the lifting rope 320 through the transmission wheel 330, thereby enabling more stable and efficient control of the lifting and lowering of the cutter head assembly 200. The driving member 310 may be configured as a motor, cylinder, etc. Referring to FIGS. 8 and 9, a wheel fixing seat 511 is provided at the side of the chassis 500 vertically opposite to the cutter head assembly 200. The transmission wheel 330 is rotatably mounted at the wheel fixing seat 511. Based on the following description of the installation posture of the transmission wheel 330, it can be seen that the wheel fixing seat 511 is provided with two left and right distributed fixing ears, and the shaft of the transmission wheel 330 is rotatably connected to the two fixing ears. In other embodiments, the driving member 310 may also control the retractable wheel 340, which directly drives the lifting rope 320 to lift and lower the cutter head assembly 200.

In this embodiment, referring to FIGS. 1, 12, and 13, the rotation axis of the retractable wheel 340 extends in the vertical direction, and the rotation axis of the transmission wheel 330 extends in the horizontal direction. The tangent edge of the retractable wheel 340 is flush with the upper tangent edge of the transmission wheel 330. The rotation axis of the retractable wheel 340 extends in the vertical direction and can be stably driven by the driving member 310 mounted at the chassis 500 to achieve reliable take-up and release of the lifting rope 320. The transmission wheel 330 smoothly turns the lifting rope 320 from the vertical take-up and release direction to the horizontal or inclined traction direction to adapt to the connection position and swing trajectory of the cutter head assembly 200. It also first counteracts the force exerted by the cutter head assembly 200 on the lifting rope 320 deviating from the swing direction, ensuring the stability of the take-up and release of the lifting rope 320 on the retractable wheel 340. The tangent edge of the retractable wheel 340 (i.e., the tangent point where the lifting rope 320 leaves the retractable wheel 340) is flush in height with the upper tangent edge of the transmission wheel 330 (i.e., the upper tangent point where the lifting rope 320 contacts the transmission wheel 330). This ensures that the transition section of the lifting rope 320 between the two wheels lies within the same horizontal plane, avoiding unnecessary bending, friction, or lateral deviation of the lifting rope 320 during operation. In this way, this not only optimizes the routing path of the lifting rope 320, reducing running resistance and wear, and improving transmission efficiency and response accuracy, but also ensures the stability and durability of the lifting assembly 300 under long-term high-frequency operation. In other embodiments, the rotation axes of the retractable wheel 340 and the transmission wheel 330 may be arranged parallel, or the transmission wheel 330, the retractable wheel 340, and the clamping hole 221 can be arranged in a three-point configuration to ensure the pre-tensioning effect of the lifting rope 320.

Regarding the structure of the retractable wheel 340, in an embodiment, please refer to FIGS. 12 and 13, the retractable wheel 340 includes an upper wheel housing 341 and a lower wheel housing 342. The upper wheel housing 341 and the lower wheel housing 342 enclose to form a winding annular groove 344. A fixing column 343 is also provided between the upper wheel housing 341 and the lower wheel housing 342. The end of the lifting rope 320 is sleeved on the fixing column 343, and the lifting rope 320 is wound around the winding annular groove 344. The retractable wheel 340 adopts a split structure and includes an upper wheel housing 341 and a lower wheel housing 342. After being assembled together, the two jointly enclose to form a winding annular groove 344 surrounding the outer periphery thereof, which is configured to guide and constrain the orderly take-up and release of the lifting rope 320. A fixing column 343 is also provided between the upper wheel housing 341 and the lower wheel housing 342. The fixing column 343 extends along the axial direction of the retractable wheel 340 and is provided close to the bottom wall of the winding annular groove 344. The fixing column 343 can be integrally formed with the upper wheel body or the lower wheel body. The end of the lifting rope 320 is provided with a fixing ring 322, and the fixing ring 322 is sleeved and fastened to the fixing column 343, thereby achieving reliable anchoring of the lifting rope 320 and the retractable wheel 340 and preventing loosening under a pulling force during take-up and release. In this way, assembly of the retractable wheel 340 and initial installation of the lifting rope 320 are facilitated. Furthermore, the winding annular groove 344 limits the lifting rope 320, which effectively prevents overlapping, jumping out of the groove, or lateral slipping of the lifting rope 320 during high-speed take-up and release or frequent direction reversal, thereby ensuring stability and repeatable positioning accuracy of the lifting and lowering movement of the cutter head assembly 200. The fixing ring 322 is integrally formed with the rope body of the lifting rope 320. In other embodiments, the end of the lifting rope 320 may be clamped to the shaft of the retractable wheel 340 in a connection manner similar to a latch.

In an embodiment, referring to FIGS. 1 to 3, the floating device for the cutter head includes two swing rods 100, and the two swing rods 100 are distributed in the vertical direction. Tension springs 130 are connected to the opposite sides of the two swing rods 100. The two swing rods 100 arranged in the vertical direction are respectively connected to the mounting base 400 and the cutter head assembly 200 through respective rotational connection structures, so as to jointly form a dual-link type floating support mechanism. A tension spring 130 is provided between the inner sides of the two swing rods 100, and the tension spring 130 is in a pre-stretched state under normal conditions and applies an elastic pulling force to bring the two swing rods 100 closer together. In this way, when the cutter head assembly 200 swings with the terrain, the tension spring 130 can provide a stable restoring torque, causing the two swing rods 100 to swing synchronously. During the upward floating of the cutter head assembly 200 over obstacles or the swinging motion driven by the lifting rope 320, the tension spring 130 promotes smooth swinging of the cutter head assembly 200, such as returning to the preset working height, avoiding slow descent or height drift due to insufficient gravity or inertial lag. At the same time, the double swing rods 100 cooperate with the tension spring 130 to form an elastic parallelogram mechanism with certain rigidity, which suppresses the forward and backward pitching or left and right swaying of the cutter head assembly 200 during movement, improving the stability and consistency of the mowing posture. In addition, the buffering effect of the tension spring 130 can absorb some impact energy, reducing the load on the swing rods 100 and the lifting assembly 300, and further alleviating the jamming and wear when the cutter head assembly 200 floats up and down. In other embodiments, only one swing rod 100 may be provided, or a tension spring 130 may be provided between the swing rod 100 and the chassis 500.

Regarding the structural form of the swing rod 100, in this embodiment, referring to FIGS. 1 to 3, the swing rod 100 includes two support arms 110 and a connecting rod 120 connecting the middle portions of the two support arms 110. The cutter head assembly 200 is located between the two support arms 110 and is rotatably connected to the ends of the support arms 110. It can be understood that the swing rod 100 adopts a frame structure, including two support arms 110 arranged in parallel and a connecting rod 120 connecting the middle portions of the two support arms 110, thereby integrally forming an H-shaped support configuration with high structural rigidity. The cutter head assembly 200 is provided between the two support arms 110 and is rotatably connected to the ends of the two support arms 110 distant from the mounting base 400 by a pin shaft or bearing, thereby obtaining symmetrical and stable support on both sides. This improves the bending resistance and torsion resistance of the swing rod 100 when subjected to the gravity of the cutter head assembly 200 and ground impact loads, avoiding lateral deflection or torsional deformation liable to occur in a single-arm structure. In addition, the clamped connection of the cutter head assembly 200 by the dual support arms 110 ensures that the cutter head assembly 200 always maintains good posture stability and rotational concentricity during vertical swinging with the swing rod 100. At the same time, the arrangement of the connecting rod 120 enhances the cooperative movement consistency between the two support arms 110, preventing unilateral jamming or asynchronous movement caused by uneven stress.

The present application also provides a mowing robot, and the mowing robot includes a floating device for a cutter head. The specific structure of the floating device for the cutter head is as described in the above embodiments. Since the mowing robot adopts all the technical solutions of all the above embodiments, it has at least all the beneficial effects brought about by the technical solutions of the above embodiments, which will not be described in detail here.

Referring to FIGS. 4, 6, and 8, the mowing robot further includes a chassis 500. The chassis 500 is recessed from bottom to top with a relief groove 510. The floating device for the cutter head is mounted at the chassis 500 and movably provided in the relief groove 510. It can be understood that when the cutter head assembly 200 floats up and down with the swing rod 100, its movement space is reasonably accommodated in the relief groove 510 of the chassis 500. The depth and contour of the relief groove 510 are designed according to the maximum swing stroke of the cutter head assembly 200, which not only provides sufficient vertical and tilting space for cutter head floating, but also prevents external protruding structures from interfering with obstacle crossing or passing performance of the robot. By integrating the floating device for the cutter head into the relief groove 510, the swing rod 100, the lifting rope 320, and the transmission wheel 330 are effectively protected from damage caused by external grass clippings, mud, or collision damage, while the overall compactness and flatness of the robot are optimized, thereby improving its traversability in narrow or complex environments. In this way, it can be ensured that the cutter head assembly 200 can perform an oscillating movement without interference when lifted upon encountering an obstacle, thereby preventing movement jamming or reset failure caused by structural constraints or housing obstruction. This avoids problems such as obstructed floating, damage, or poor floating of the cutter head assembly 200, and enhances the overall environmental adaptability, operational stability, and long-term operational reliability of the mowing robot.

In this embodiment, referring to FIGS. 4, 6, and 10, an upper side of the chassis 500 is recessed with a mounting groove 520. The lifting rope 320 is located between the bottom wall of the relief groove 510 and the cutter head assembly 200. The driving member 310 is mounted in the mounting groove 520, and the output shaft of the driving member 310 passes through the relief groove 510 and is drivingly connected to the lifting rope 320; and/or the opening of the mounting groove 520 is also sealingly provided with a cover body. It should be noted that the output shaft of the driving member 310 extends downward through the chassis 500 and penetrates through the bottom wall of the relief groove 510, and is drivingly connected, directly or indirectly, to the lifting rope 320 located in the relief groove 510. On the one hand, arranging the driving member 310 in the mounting groove 520 at an upper position inside the chassis 500 isolates the driving member from muddy water, grass debris and impact loads in the bottom working area. On the other hand, the lifting rope 320 is routed between the bottom of the relief groove 510 and the cutter head assembly 200, thereby avoiding the risk of exposure, entanglement or abrasion. In addition, a cover body is sealingly provided at the opening of the mounting groove 520 by means of a snap fit, screws, sealant or the like. For example, a sealing ring is provided at a peripheral edge of the opening of the mounting groove 520 to prevent external contaminants from entering the interior of the driving member 310, thereby ensuring stable operation thereof in a long-term outdoor humid and dusty environment.

The mounting groove 520 is elongated and extends in the front-rear direction. The driving member 310 is configured as a motor and is horizontally provided in a front-rear direction. A gearbox is provided at the output end of the motor. The gearbox is configured to change a power output direction of the motor and also adjust a torque output by the motor, such that the output end of the motor is horizontally provided and an output end of the gearbox is vertically provided, so that the driving member 310 can drive a retractable wheel 340 rotating about a vertical axis. In this way, the space occupied by the mounting groove 520 in the vertical and horizontal directions is reduced, and the mounting position of the driving member 310 is adapted to the distance between the two cutter head bodies 210, such that the driving member 310, the retractable wheel 340, and the transmission wheel 330 are located in the space between the two cutter head bodies 210, thereby improving the compactness of the mowing robot and reducing the overall height of the mowing robot. In addition, an avoidance hole is formed in the bottom wall of the relief groove 510. The output shaft of the motor or the transmission passes through the avoidance hole, and the retractable wheel 340 is fixedly connected to the output shaft. A bearing and an oil seal structure are provided at the avoidance hole to ensure the rotational stability of the retractable wheel 340 on the output shaft.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A floating device for a cutter head, applied to a mowing robot, comprising:

two swing rods mounted at the mowing robot and capable of swinging relative to the mowing robot;

a cutter head assembly rotatably connected to the one of the swing rods;

a lifting assembly comprising a driving member and a lifting rope, wherein the driving member is mounted at the mowing robot and drivingly connected to the lifting rope, and the lifting rope is connected to the cutter head assembly for driving the cutter head assembly to swing with one of the swing rods; and a mounting base;

wherein the mounting base is mounted at the mowing robot, one end of one of the swing rods is rotatably connected to the mounting base, and another end of one of the swing rods is rotatably connected to a side of the cutter head assembly distant from the mounting base;

wherein a movable groove is provided at a side of the mounting base facing the cutter head assembly, an end of one of the swing rods is rotatably connected to the movable groove, an upper limiting portion is provided at an upper side of an opening of the movable groove, the upper limiting portion is capable of abutting against an upper side of one of the swing rods in a limiting manner, a lower limiting portion is provided at the end of one of the swing rods, and the lower limiting portion is capable of abutting against a bottom wall of the movable groove in a limiting manner.

2. The floating device for the cutter head according to claim 1, wherein the cutter head assembly comprises a cutter head body and a cutter head frame, the cutter head body is mounted at the cutter head frame, and the lifting rope is connected to the cutter head frame.

3. The floating device for the cutter head according to claim 2, wherein the cutter head assembly comprises two cutter head bodies, the lifting assembly is located between the two cutter head bodies, and the lifting rope is connected to the cutter head frame between the two cutter head bodies.

4. The floating device for the cutter head according to claim 2, wherein the cutter head frame is provided with a clamping hole, a limiting groove is provided at a lower side of the cutter head frame, the clamping hole penetrates through a bottom of the limiting groove, a limiting ball is provided at an end of the lifting rope, the lifting rope passes through the clamping hole, and the limiting ball is mounted in the limiting groove.

5. The floating device for the cutter head according to claim 2, wherein the cutter head assembly comprises two cutter head bodies, the lifting assembly is located between the two cutter head bodies, and the lifting rope is connected to the cutter head frame between the two cutter head bodies; and the cutter head frame is provided with a clamping hole, a limiting groove is provided at a lower side of the cutter head frame, the clamping hole penetrates through a bottom of the limiting groove, a limiting ball is provided at an end of the lifting rope, the lifting rope passes through the clamping hole, and the limiting ball is mounted in the limiting groove.

6. The floating device for the cutter head according to claim 1, wherein the lifting rope is connected to a side of the cutter head assembly distant from the mounting base.

7. The floating device for the cutter head according to claim 1, wherein the lifting assembly further comprises a retractable wheel and at least one transmission wheel;

an end of the lifting rope is connected to the retractable wheel, and the other end of the lifting rope is wound around the transmission wheel and connected to the cutter head assembly; and the retractable wheel is provided close to the mounting base, and the transmission wheel is provided close to the side of the cutter head assembly distant from the mounting base.

8. The floating device for the cutter head according to claim 7, wherein a rotation axis of the retractable wheel extends in a vertical direction, the rotation axis of the transmission wheel extends in a horizontal direction, and a tangent edge of the retractable wheel is flush with an upper tangent edge of the transmission wheel.

9. The floating device for the cutter head according to claim 7, wherein the retractable wheel comprises an upper wheel housing and a lower wheel housing, the upper wheel housing and the lower wheel housing enclose to form a winding annular groove, a fixing column is further provided between the upper wheel housing and the lower wheel housing, the end of the lifting rope connected to the retractable wheel is sleeved on the fixing column, and the lifting rope is wound around the winding annular groove.

10. The floating device for the cutter head according to claim 7, wherein a rotation axis of the retractable wheel extends in a vertical direction, the rotation axis of the transmission wheel extends in a horizontal direction, and a tangent edge of the retractable wheel is flush with an upper tangent edge of the transmission wheel; and the retractable wheel comprises an upper wheel housing and a lower wheel housing, the upper wheel housing and the lower wheel housing enclose to form a winding annular groove, a fixing column is further provided between the upper wheel housing and the lower wheel housing, an end of the lifting rope is sleeved on the fixing column, and the lifting rope is wound around the winding annular groove.

11. The floating device for the cutter head according to claim 1, wherein the two swing rods are distributed in the vertical direction, and tension springs are connected to opposite sides of the two swing rods.

12. The floating device for the cutter head according to claim 1, wherein each swing rod comprises two support arms and a connecting rod connecting middle portions of the two support arms, and the cutter head assembly is located between the two support arms and rotatably connected to ends of the two support arms.

13. The floating device for the cutter head according to claim 1, wherein the two swing rods are distributed in the vertical direction, and tension springs are connected to opposite sides of the two swing rods; and each swing rod comprises two support arms and a connecting rod connecting middle portions of the two support arms, and the cutter head assembly is located between the two support arms and rotatably connected to ends of the two support arms.

14. A mowing robot, comprising:

a chassis; and the floating device for the cutter head according to claim 1, wherein the chassis is recessed from bottom to top with a relief groove, and the floating device for the cutter head is mounted at the chassis and movably provided in the relief groove.

15. The mowing robot according to claim 14, wherein an upper side of the chassis is recessed with a mounting groove, the lifting rope is located between a bottom wall of the relief groove and the cutter head assembly, the driving member is mounted in the mounting groove, and an output shaft of the driving member passes through the relief groove and is drivingly connected to the lifting rope.

16. The mowing robot according to claim 15, wherein an opening of the mounting groove is further sealingly provided with a cover body.

17. The mowing robot according to claim 14, wherein an upper side of the chassis is recessed with a mounting groove, the lifting rope is located between a bottom wall of the relief groove and the cutter head assembly, the driving member is mounted in the mounting groove, and an output shaft of the driving member passes through the relief groove and is drivingly connected to the lifting rope; and an opening of the mounting groove is further sealingly provided with a cover body.

* * * * *